US008929699B2

(12) United States Patent
Shashi et al.

(10) Patent No.: US 8,929,699 B2
(45) Date of Patent: Jan. 6, 2015

(54) SYMMETRICAL BRANCHING ORTHO MODE TRANSDUCER (OMT) WITH ENHANCED BANDWIDTH

(75) Inventors: Bhushan Sharma Shashi, Ahmedabad (IN); Jyoti Rajeev, Ahmedabad (IN); Maheshbhai Pandya Jigar, Ahmedabad (IN); Shankar Nair Jidesh, Ahmedabad (IN); Sood Khagindra, Ahmedabad (IN); Harshadrai Trivedi Yogesh, Ahmedabad (IN)

(73) Assignee: Indian Space Research Organisation, Bangalore (IN)

( * ) Notice: Subject to any disclaimer, the term of this patent is extended or adjusted under 35 U.S.C. 154(b) by 422 days.

(21) Appl. No.: 13/386,553

(22) PCT Filed: Aug. 31, 2009

(86) PCT No.: PCT/IN2009/000477
§ 371 (c)(1),
(2), (4) Date: Apr. 19, 2012

(87) PCT Pub. No.: WO2011/007360
PCT Pub. Date: Jan. 20, 2011

(65) Prior Publication Data
US 2012/0201496 A1 Aug. 9, 2012

(30) Foreign Application Priority Data
Jul. 13, 2009 (IN) ........................... 1659/CHE/2009

(51) Int. Cl.
*G02B 6/26* (2006.01)
*H01P 1/161* (2006.01)
*H01P 5/12* (2006.01)

(52) U.S. Cl.
CPC ..................................... *H01P 1/161* (2013.01)
USPC ............................ 385/43; 333/125; 333/126

(58) Field of Classification Search
CPC ....................................................... H01P 1/161
USPC .................................... 333/125–126; 385/43
See application file for complete search history.

(56) References Cited

U.S. PATENT DOCUMENTS

| | | | | |
|---|---|---|---|---|
| 4,052,724 | A * | 10/1977 | Takeichi et al. | 343/786 |
| 4,797,681 | A | 1/1989 | Kaplan et al. | |
| 5,617,108 | A * | 4/1997 | Silinsky et al. | 343/786 |
| 6,313,714 | B1 * | 11/2001 | Junker et al. | 333/125 |
| 6,621,375 | B2 | 9/2003 | Vezmar et al. | |
| 6,657,516 | B1 * | 12/2003 | Junker et al. | 333/125 |
| 8,508,312 | B2 * | 8/2013 | Perottino et al. | 333/126 |
| 2002/0187760 | A1 | 12/2002 | Krishmar-Junker et al. | |
| 2003/0052831 | A1 * | 3/2003 | Knop et al. | 343/786 |
| 2004/0246069 | A1 | 12/2004 | Yoneda et al. | |
| 2007/0210882 | A1 | 9/2007 | Mahon et al. | |
| 2012/0201496 | A1 * | 8/2012 | Shashi et al. | 385/43 |

* cited by examiner

*Primary Examiner* — Rhonda Peace
(74) *Attorney, Agent, or Firm* — D. Peter Hochberg; Sean F. Mellino; Richard A. Wolf

(57) ABSTRACT

An Ortho Mode Transducer (OMT) comprising a main guide configured with a set of ports and at both ends for communicating a band of frequencies. The ports and are placed at a predetermined distance from each other to form a taper section. Branching waveguides are disposed around the main guide for extracting polarization signals from the main guide. Coupling apertures are disposed apart along the periphery of the main guide for coupling the branching waveguides to the main guide. The coupling apertures are aligned parallel to a longitudinal axis of the main guide and extended to the taper portion of the main guide, which enhances bandwidth performance without the need for additional extraneous impedance matching elements.

13 Claims, 4 Drawing Sheets

SYMMETRICAL BRANCHING ORTHO MODE TRANSDUCER (OMT) WITH ENHANCED BANDWIDTH

CROSS-REFERENCE TO RELATED APPLICATIONS

This application is a National Stage application of International Application No. PCT/IN2009/000477, filed on Aug. 31, 2009, which claims priority of Indian patent application number 1659/CHE/2009, filed on Jul. 13, 2009, both of which are incorporated herein by reference in their entireties.

BACKGROUND OF THE INVENTION

1. Field of the Invention

The present invention relates to the fields of waveguides and coupling mechanism for extracting/injecting a signal of single/two orientation from a guide conveying information in two orthogonal orientations. The present invention specifically relates to a waveguide Ortho Mode Transducer (OMT) for extracting waves of orthogonal polarizations from a main guide.

2. Description of the Prior Art

A number of schemes are in vogue for extracting/injecting a signal of a particular orientation from a mixture of two orthogonal orientations. Generally, such schemes have coupling apertures aligned to the respective field to be extracted. The coupling apertures are placed along the periphery of the waveguide for extraction of a wave of the particular orientation, with a similar configuration for the orthogonal signal. In general, the slots are disposed at an angular interval of 90 degree around the main guide corresponding to the signals that are spatially aligned in quadrature and hence at an angular interval of 180 degree for similar polarization.

In addition, the main guide is tapered so as to result a cut-off region for the signals of both the orientations, which ensures the reflection of any signals that fails to couple directly through the apertures. The placement of the apertures at a predetermined location ensures the coupling of the reflected signal. The conventional art for coupling of the orthogonally aligned waves differs in placement of the coupling apertures that being on the periphery of the main guide.

Referring to FIG. 1*a* and 1*b*, 3-dimensional and side views of an ortho mode transducer with coupling apertures in the axis of a main guide are illustrated, respectively, in accordance with prior art. The main guide of circular cross section comprises two ports 1 and 3 at both ends, of a predetermined dimension so adjusted that the requisite band of frequencies are communicated without hindrance to the intended networks. The ports 1 and 3 are placed at a predetermined distance from each other, which ensues in a taper section 2 between the ports 1 and 3. Four coupling apertures 4 are placed parallel to the axis of the information conveying main guide. The main guide of circular cross section encloses the information conveyed in spatially orthogonal waves designated herein as H and V for the horizontal and vertical orientations, respectively.

The main guide of circular cross section is bridged to the related RF networks through the port 1, at which both the V and H signals are available for processing by the polarization discriminator. The port 3 of the main guide is so configured that the guide remains at cut off in the frequencies of interest, and hence projects a virtual short. It is evident to those skilled in the art that the proper placement of this gradual virtual-short causes the reflected waves to be in phase with the incident waves, thus ensuring maximum coupling.

Moreover, the coupling apertures 4 communicate to the external networks via branching waveguide 5 also disposed in a symmetrical and/or orthogonal manner around the main guide. In order to combine the waves from each of the branching waveguides 5, the coupling apertures 4 corresponding to same polarization are connected to a hybrid network composed of waveguide circuit elements such as Magic-T (not shown).

Referring to FIGS. 2*a* and 2*b*, 3-dimensional and side views of an Ortho mode transducer with coupling apertures in a taper portion 2 of a main guide are illustrated, respectively, in accordance with prior art. The coupling apertures 4 are aligned in a manner parallel to the tapered portion 2 of the main guide. In order to increase the bandwidth, the coupling apertures 4 are placed along the tapered portion 2 of the information conveying main guide. In addition, the two ports 1 and 3 at both ends of the main guide are of different dimension and are spaced apart by a predetermined distance. The orthogonal polarizations are extracted from the main guide via the coupling apertures 4 and communicated to the external network by the branching waveguides 5. The combination of the waves of like polarization from the respective branching waveguides 5 is effected by the use of waveguide circuit elements such as Magic T.

An innate problem with the prior art is that the coupling aperture being of an electrically resonant nature limits the bandwidth that can be attained. An attempt to solve the same was effected by differing in the placement of the slot along the information conveying main guide.

It is evident to those skilled in the art that such tapers and coupling apertures are potential sources of unwanted higher order modes, which deteriorate the performance at higher frequencies and the same circumvented by the use of symmetrical branching structures.

In summary, the existing symmetrical branching OMTs are limited to narrow band applications and therefore what is needed is a symmetrical branching OMT that can be made to perform satisfactorily for moderate to wide band applications.

SUMMARY OF THE PRESENT INVENTION

Object of the Invention

An object of the present invention is to provide a symmetrical branching waveguide Ortho Mode Transducer (OMT), with enhanced bandwidth performance without the need for additional extraneous impedance matching elements.

According to one aspect, the present invention, which achieves the objectives, relates to an Ortho Mode Transducer (OMT) comprising a main guide configured with a set of ports at both ends for communicating a band of frequencies. The ports are placed at a predetermined distance from each other to form a taper section. Branching waveguides are disposed around the main guide for extracting polarization signals from the main guide. Coupling apertures are disposed apart along the periphery of the main guide for coupling the branching waveguides to the main guide. The coupling apertures are aligned parallel to a longitudinal axis of the main guide and extended to the taper portion of the main guide, which enhances bandwidth performance without the need for additional extraneous impedance matching elements.

Furthermore, the coupling apertures are symmetrically disposed along the circular cross section of the main waveguide. A pair of coupling apertures placed in place extracts wave of one orientation of the signal while the pair disposed orthogonal to the aforementioned pair extracts the wave of orthogonal polarization. The coupling apertures are placed in such a way that a portion of the coupling apertures are aligned parallel to the axis of the main guide while the remaining portion of the coupling apertures runs along the tapered portion of the main guide. Thus, the ortho mode transducer, i.e. polarization discriminator, exhibits Low VSWR and high Isolation between the spatially orthogonal waves over a moderate bandwidth.

The scope of the objectives and advantages of the invention would be clear to those skilled in the art in view of the mode of operation of the invention and suitable industrial applicability as described and from the illustrations provided herein.

BRIEF DESCRIPTION OF THE DRAWINGS

The invention will be discussed in greater detail with reference to the accompanying Figures.

DETAILED DESCRIPTION OF THE INVENTION

Figure 1A:
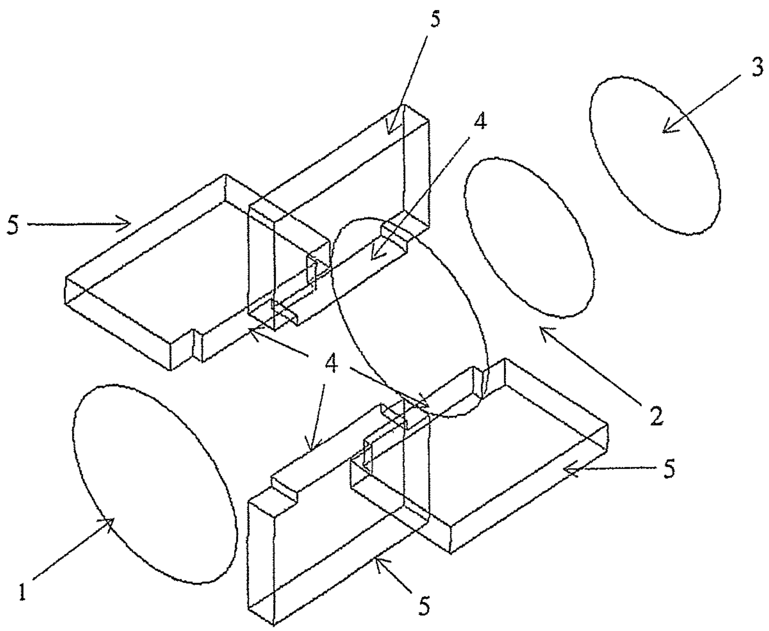
FIG. 1(a) (Prior Art)
FIG. 1*a* shows a 3-dimensional view of an ortho mode transducer with coupling apertures in the axis of a main guide, in accordance with prior art.
Figure 1B:
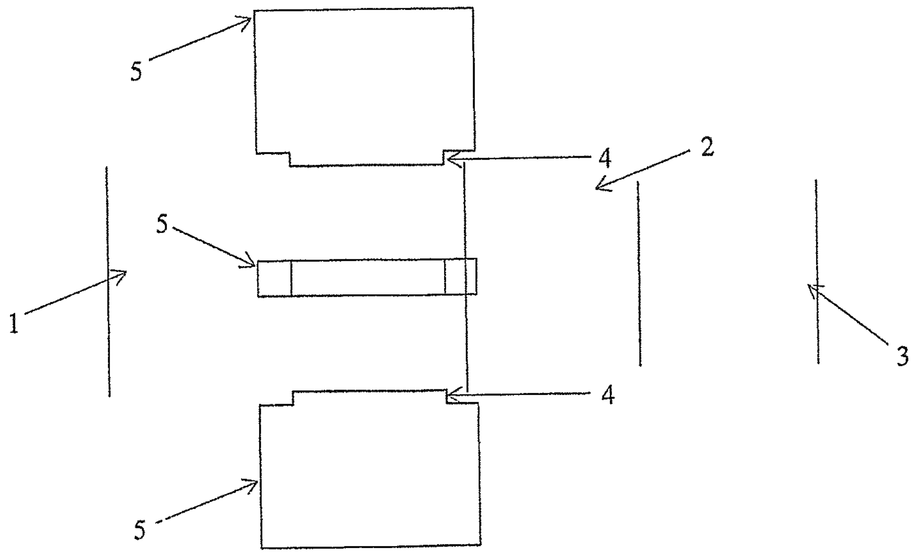
FIG. 1(b) (Prior Art)
FIG. 1*b* illustrates a side view of the ortho mode transducer of FIG. 1*a*, in accordance with prior art.
Figure 2A:
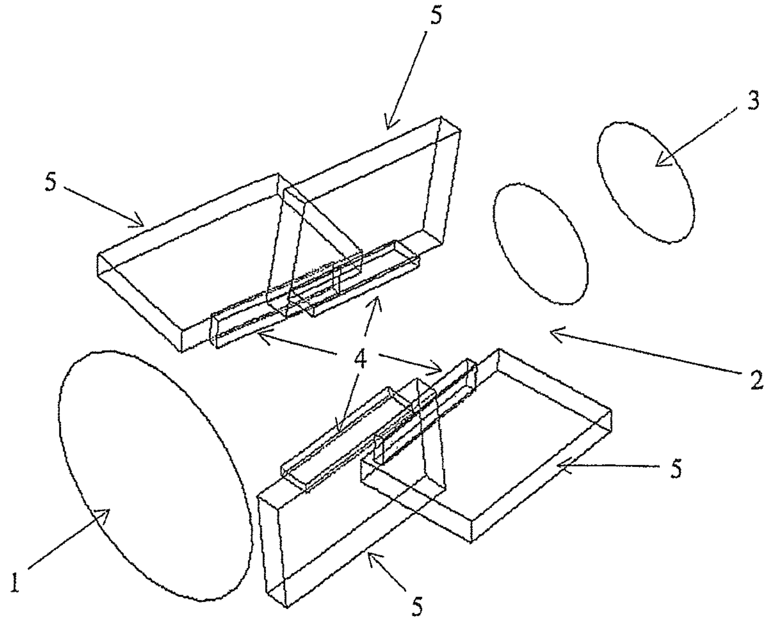
FIG. 2(a) (Prior Art)
FIG. 2*a* illustrates a 3-dimensional view of an ortho mode transducer with coupling apertures in a taper portion of the main guide, in accordance with prior art.
Figure 2B:
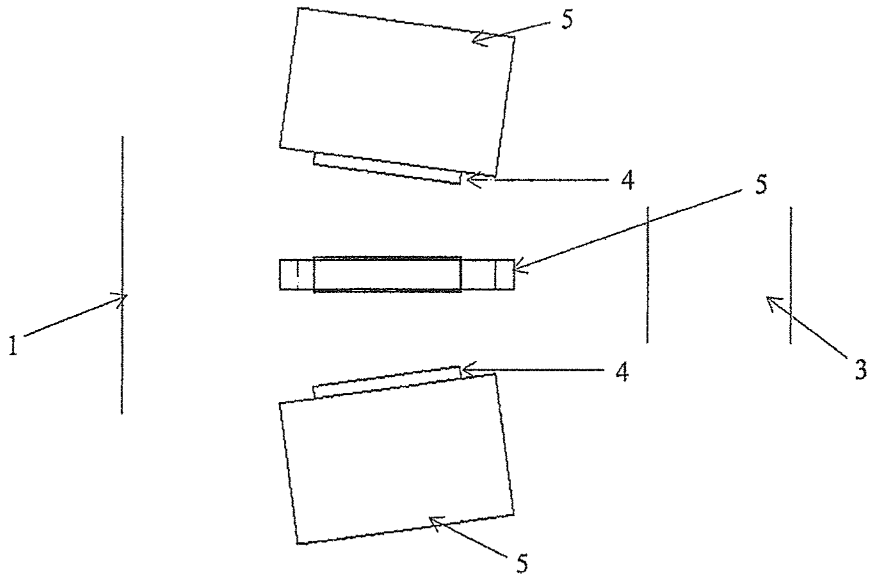
FIG. 2(b) (Prior Art)
FIG. 2*b* illustrates a side view of the ortho mode transducer of FIG. 2*b*, in accordance with prior art.
Figure 3A:
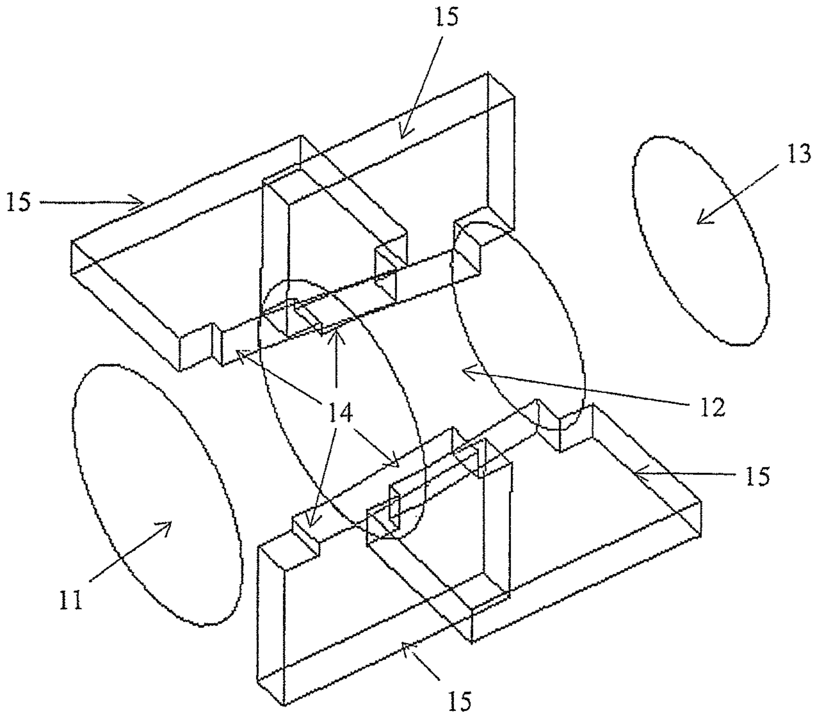
FIG. 3*a* illustrates a 3-dimensional view of an ortho mode transducer with coupling apertures of non-uniform thickness, in accordance with one embodiment of the present invention.
Figure 3B:
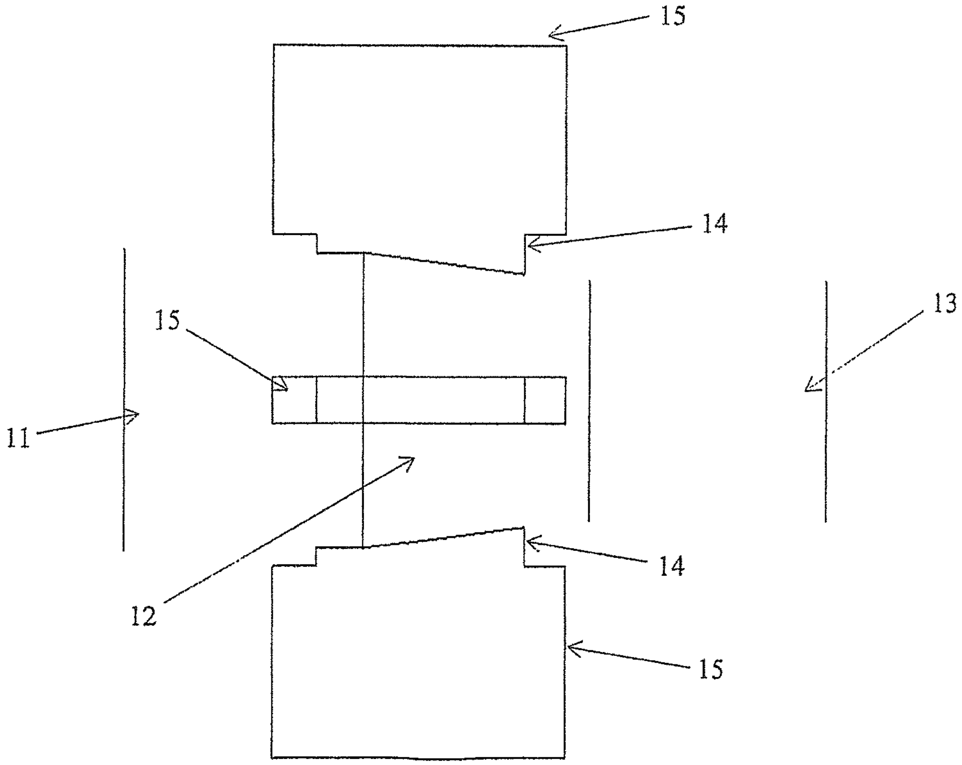
FIG. 3*b* illustrates a side view of the ortho mode transducer of FIG. 3*a*, in accordance with one embodiment of the present invention.

FIGS. 3*a* and 3*b* illustrate 3-dimensional and side views of an ortho mode transducer with coupling apertures of non-uniform thickness, respectively, in accordance with one embodiment of the present invention. According to the present invention, a polarization discriminator generally referred to as Ortho Mode Transducer (OMT), which enables performance over an enhanced bandwidth. The Ortho Mode Transducer (OMT) separately extracts two spatially orthogonal waves from a common guide carrying both the spatially orthogonal waves.

The OMT consist of a main guide configured with a set of ports 11 and 13 at both ends for communicating a band of frequencies. The main guide is formed of circular cross section, which carries information in two spatially orthogonal waves. The ports 11 and 13 are placed at a predetermined distance from each other to form a taper section 12 in the main guide. The main circular waveguide is suitably tapered with one port 11 of the guide forming as an input while the other port 13 is gradually conveyed to cut off for the maximum frequency of interest, which is to be coupled.

Furthermore, branching waveguides 15 are disposed around the main guide for extracting the separate orthogonal waves of polarizations and its availability at physically distinct terminals. Such extraction of the polarization signals is made available at physically distinct terminals with the aid of combiners such as Magic T. The branching waveguides 15 are coupled to the main guide through coupling apertures 14 for extracting/injecting the orthogonal" waves from the main waveguide. The coupling apertures 14 are disposed orthogonally along the periphery of the main guide with the larger dimension along the direction of signal flow. The branching arms or waveguides 15 from the coupling aperture 14 are disposed along the main waveguide in an orthogonal manner, from which the orthogonal polarizations are made available for subsequent processing.

Moreover, the coupling apertures 14 are aligned parallel to a longitudinal axis of the main guide and extend to the taper portion 12 of the main guide, which enhances bandwidth performance without the need for additional extraneous impedance matching elements. In this specific embodiment, the coupling apertures 14 are of non-uniform thickness with the branching waveguides 15 parallel to the longitudinal axis of the main guide, as shown in FIGS. 3*a* and 3*b*. It is apparent to those skilled in the art that such a configuration functions as a stub transformer.

Figure 4A:
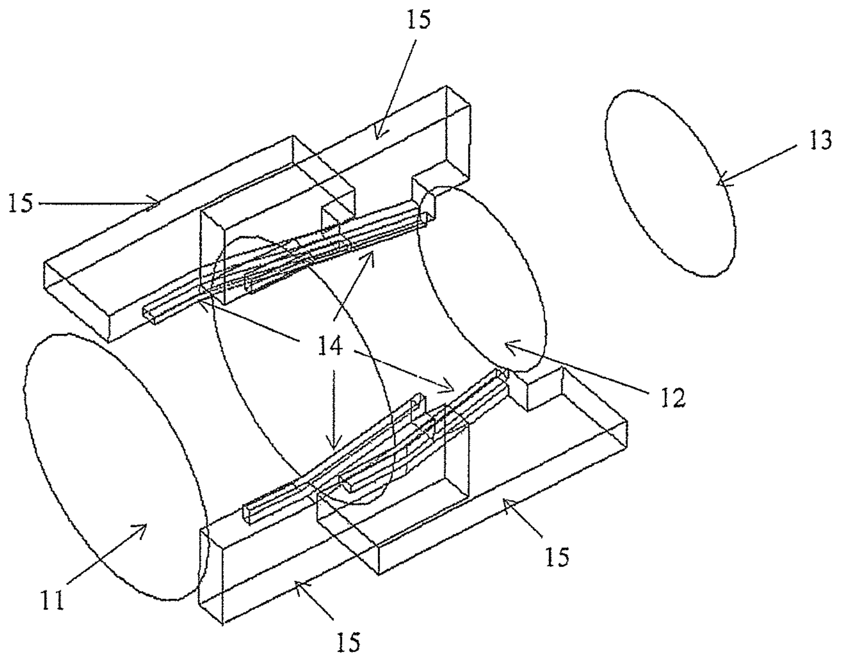
FIG. 4*a* illustrates a 3-dimensional view of an ortho mode transducer with coupling apertures of uniform thickness, in accordance with another embodiment of the present invention.
Figure 4B:
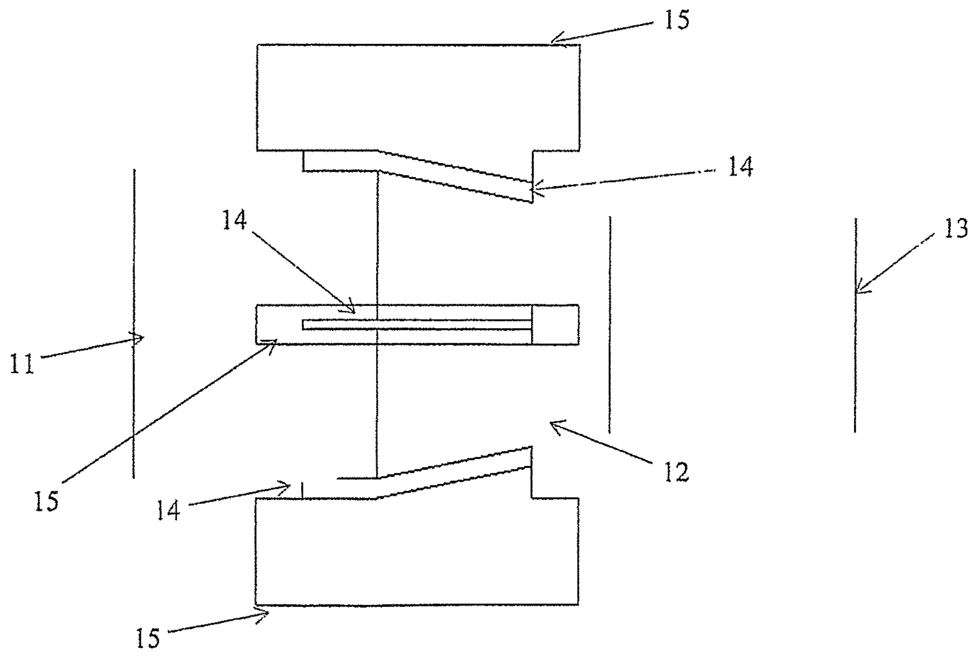
FIG. 4*b* illustrates a side view of the ortho mode transducer of FIG. 4*a*, in accordance with another embodiment of the present invention.

FIGS. 4*a* and 4*b* illustrate 3-dimensional and side views of an ortho mode transducer with coupling apertures of uniform thickness, respectively, in accordance with another embodiment of the present invention. The main circular waveguide consist of two ports 11 and 13 of different dimensions at its ends and a predetermined spacing between the ports 11 and 13 forming the taper section 12 in order to carry the information enclosed in two spatially orthogonal waves. The coupling apertures 14 are disposed of in a symmetrical manner angularly spaced by 90 degrees along the periphery with respect to the main guide. A predetermined portion of coupling aperture 14 is on straight portion of the main guide while the remaining lies along the taper section.

The branching waveguides 15 connected to the coupling apertures 14 make available the waves of a similar spatial orientation for combination by waveguide circuits such as Magic T. In this specific embodiment, the coupling apertures 14 are of uniform thickness, as shown in FIGS. 4*a* and 4*b*. Such ortho mode transducer, i.e. polarization discriminator, exhibits Low VSWR and high Isolation between the spatially orthogonal waves over a moderate bandwidth.

It is evident to those skilled in the art that although the invention herein is described in terms of specific embodiments thereof, there exist numerous alternatives, modifications and variations of the invention. Hence all variations, modifications and alternatives that falls within the broad scope of the appended claims comes under the gamut of the invention.

What has been described above are preferred aspects of the present invention. It is of course not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, combinations, modifications, and variations that fall within the spirit and scope of the appended claims.

We claim:

1. A coupling aperture for a waveguide circuit, said waveguide circuit comprising a main guide with a taper portion and a branching waveguide, said main guide having a circular cross-section and a longitudinal axis, wherein a predetermined portion of said coupling aperture is placed parallel to the longitudinal axis of said main guide and the remaining portion of said coupling aperture is aligned parallel to the taper portion of the main guide, wherein said coupling aperture is disposed orthogonally along the periphery of the main guide and parallel to the longitudinal axis of the main guide with a larger dimension along the signal flow direction, and wherein said coupling aperture couples the branching waveguide to the main guide.

2. The coupling aperture according to claim 1, wherein said coupling aperture comprises a uniform thickness such that said branching waveguide is aligned parallel to the longitudinal axis of said main guide.

3. The coupling aperture according to claim 1, wherein said coupling aperture comprises a non-uniform thickness such that said branching waveguide is aligned parallel to the longitudinal axis of said main guide.

4. The coupling aperture according to claim 1, wherein said coupling aperture comprises a uniform thickness such that said branching waveguide is aligned parallel to said taper portion of said main guide.

5. The coupling aperture according to claim 1, wherein said coupling aperture comprises a non-uniform thickness such that said branching waveguide is aligned parallel to said taper portion of said main guide.

6. A waveguide Ortho Mode Transducer (OMT), comprising:

a main guide having a circular cross section and a longitudinal axis, and having a plurality of ports at both ends for communicating orthogonal polarized signals, wherein said plurality of ports are placed at a predetermined distance from each other to form a taper section, and wherein the ports of one end are an input and the ports of the other end are gradually conveyed to cut off for the maximum frequency of interest which is to be coupled;

one or more branching waveguides disposed around said main guide in an orthogonal manner for extracting the orthogonal polarized signals from said main guide; and one or more coupling apertures, wherein a predetermined portion of each coupling aperture of said one or more coupling apertures is placed parallel to the longitudinal axis of said main guide and the remaining portion of said coupling aperture is aligned parallel to the taper portion of the main guide, wherein said one or more coupling apertures is disposed orthogonally along the periphery of the main guide and parallel to the longitudinal axis of the main guide with a larger dimension along the signal flow direction, and wherein said one or more coupling apertures couples the branching waveguide to the main guide, wherein said one or more coupling apertures are symmetrically disposed at an angular interval of 90 degrees apart or at an arbitrary angle along the periphery of said main guide, and wherein a waveguide circuit combines the signals of identical polarization coupled on said one or more coupling apertures, wherein said Ortho Mode Transducer (OMT) enables performance over an enhanced bandwidth.

7. The waveguide Ortho Mode Transducer according to claim 6, wherein said waveguide Ortho Mode Transducer extracts and/or injects the signals of orthogonal polarizations in a Multi-Band Dual Polarized Feed System.

8. The waveguide Ortho Mode Transducer according to claim 6, wherein said waveguide Ortho Mode Transducer extracts and/or injects the signals of dominant mode, wherein said main guide comprises a cross-section selected from the group consisting of a circular, rectangular, and square cross section.

9. The waveguide Ortho Mode Transducer according to claim 6, wherein said waveguide Ortho Mode Transducer extracts and/or injects the signals of modes other than dominant mode, wherein said main guide comprises a cross-section selected from the group consisting of a circular, rectangular, and square cross section; say Rotary joints, mode-coupler.

10. The waveguide Ortho Mode Transducer according to claim 6, wherein said one or more coupling apertures comprises a uniform thickness such that said branching waveguide is aligned parallel to the longitudinal axis of said main guide.

11. The waveguide Ortho Mode Transducer according to claim 6, wherein said one or more coupling apertures comprises a non-uniform thickness such that said branching waveguide is aligned parallel to the longitudinal axis of said main guide.

12. The waveguide Ortho Mode Transducer according to claim 6, wherein said one or more coupling apertures comprises a uniform thickness such that said branching waveguide is aligned parallel to said taper portion of said main guide.

13. The waveguide Ortho Mode Transducer according to claim 6, wherein said one or more coupling apertures comprises a non-uniform thickness such that said branching waveguide is aligned parallel to said taper portion of said main guide.

* * * * *